(12) United States Patent
Moon et al.

(10) Patent No.: US 10,234,617 B2
(45) Date of Patent: Mar. 19, 2019

(54) GLASS LIGHT GUIDE PLATE AND BACK LIGHT UNIT HAVING THE SAME

(71) Applicant: LG DISPLAY CO., LTD., Seoul (KR)

(72) Inventors: ChangYul Moon, Paju-si (KR); YoungHun Jeong, Seoul (KR); Kiyong Yang, Seoul (KR); Sehyun Park, Incheon (KR)

(73) Assignee: LG DISPLAY CO., LTD., Seoul (KR)

( * ) Notice: Subject to any disclaimer, the term of this patent is extended or adjusted under 35 U.S.C. 154(b) by 142 days.

(21) Appl. No.: 15/336,298

(22) Filed: Oct. 27, 2016

(65) Prior Publication Data

US 2017/0123134 A1    May 4, 2017

(30) Foreign Application Priority Data

Oct. 30, 2015 (KR) .................. 10-2015-0151497

(51) Int. Cl.
*F21V 8/00* (2006.01)

(52) U.S. Cl.
CPC ......... *G02B 6/0036* (2013.01); *G02B 6/0041* (2013.01); *G02B 6/0061* (2013.01); *G02B 6/0055* (2013.01)

(58) Field of Classification Search
CPC ... G02B 6/0043; G02B 6/0035; G02B 6/0033
See application file for complete search history.

(56) References Cited

U.S. PATENT DOCUMENTS

| | | | | |
|---|---|---|---|---|
| 5,883,997 A | * | 3/1999 | Carlnas | G02B 6/241 385/123 |
| 2007/0047263 A1 | * | 3/2007 | Cheng | G02B 6/0021 362/628 |
| 2012/0274874 A1 | * | 11/2012 | Lin | G02B 6/0036 349/62 |
| 2013/0170245 A1 | * | 7/2013 | Hong | G02B 6/001 362/555 |
| 2014/0029295 A1 | * | 1/2014 | Hsiao | G02B 6/0011 362/606 |
| 2014/0036528 A1 | * | 2/2014 | Kim | G02B 6/26 362/606 |
| 2014/0160796 A1 | * | 6/2014 | He | G02B 6/0063 362/619 |
| 2014/0313772 A1 | * | 10/2014 | Kamada | G02B 6/0036 362/611 |
| 2015/0103398 A1 | * | 4/2015 | Banerjee | G02B 5/281 359/360 |
| 2015/0175822 A1 | * | 6/2015 | Andre | C09D 11/101 347/102 |
| 2016/0109637 A1 | * | 4/2016 | Teragawa | G02B 6/0055 349/65 |

* cited by examiner

*Primary Examiner* — Jong-Suk (James) Lee
*Assistant Examiner* — Christopher E Dunay
(74) *Attorney, Agent, or Firm* — Birch, Stewart, Kolasch & Birch, LLP

(57) ABSTRACT

Discussed is a glass light guide plate that is used in a back light unit of a display device. Some features of the glass light guide plate for the back light unit can be improved by optimizing a relationship between a direction of a bubble inside the glass light guide plate and a light source, the sizes of the bubble and a light guide pattern, and so on, and by optimizing an arrangement density of light guide patterns in each region, a kind of light guide pattern ink (IR-curable ink), a curing condition, a refractive index, and so on to be suitable for the material of the glass light guide plate.

15 Claims, 12 Drawing Sheets

FIG.8B

| OPTICAL GAP(O/G) | 0.1mm | 0.2mm | 0.3mm |
|---|---|---|---|
| BRIGHTNESS OF 1 PANEL | 100% | 96.6% | 92.3% |
| AVERAGE BRIGHTNESS OF 9 PANELS | 100% | 97.2% | 92.9% |
| FOS (LIGHT INLET PART) | BRIGHT-LINE 2 LEVEL | BRIGHT-LINE 2.5 LEVEL | BRIGHT-LINE 4 LEVEL |

GLASS LIGHT GUIDE PLATE AND BACK LIGHT UNIT HAVING THE SAME

CROSS REFERENCE TO RELATED APPLICATION

This application claims priority from Korean Patent Application No. 10-2015-0151497, filed on Oct. 30, 2015, which is hereby incorporated by reference for all purposes as if fully set forth herein.

BACKGROUND OF THE INVENTION

Field of the Invention

The present invention relates to a back light unit for a display device and a glass light guide plate included therein. More particularly, the present invention relates to a technology for solving a problem of performance deterioration caused by bubbles in a bare glass, and optimizing a material of an ink for light guide patterns (hereinafter, referred to as a "light guide pattern ink), and an arrangement and curing method of light guide patterns according to the use of a glass material.

Description of the Related Art

According to the development of an information society, demands for display devices for displaying images have increased in various types. Recently, various display devices, such as a Liquid Crystal Display (LCD), a Plasma Display Panel (PDP), and an Organic Light Emitting Diode (OLED) display device, have been utilized.

Among the display devices, the LCD includes an array substrate including a thin film transistor, which is a switching element configured to perform an ON/OFF control on each of pixel regions; an upper substrate including a color filter and/or a black matrix or the like; a display panel including a liquid crystal material layer and formed between the array substrate and the upper substrate; a driving unit configured to control the thin film transistor; and a Back Light Unit (BLU) configured to provide light to the display panel. An arrangement state of the liquid crystal material layer is adjusted according to an electric field applied between a pixel (PXL) electrode and a common voltage (Vcom) electrode, which are provided in the pixel region, and thus, the light transmittance of the liquid crystal material layer is adjusted such that an image is displayed.

The liquid crystal display device needs a back light unit to provide light from the outside. The back light unit may include sub-units, such as a light source, a light guide plate, a reflector, and an upper sheet, and may further include at least one frame or chassis as a support structure to support a side face and a rear face of the display device.

Among the components of the back light unit, the Light Guide Plate (LGP) is a planar member used to uniformly guide light from the light source to the entire display device, and may include a predetermined pattern that is formed on at least one face of the planar member for the purpose of a uniform distribution of light or the like.

Typically, the light guide plate is made of a light transmissive plastic material, such as PolyMethyl MethAcrylate (PMMA).

However, despite a high light transmittance thereof, the plastic light guide plate has become a bar to the slimming of the entire display device because the plastic light guide plate needs a thickness of a predetermined level or more in order to maintain a predetermined rigidity or the like.

In addition, the plastic light guide plate has disadvantages in that, due to a large thermal expansion coefficient and a high moisture-swelling property, the plastic light guide plate is limited in arrangement with a light source part, and requires an additional support structure.

In order to solve the disadvantages of the plastic light guide plate, a glass light guide plate made of a glass material has recently been considered.

The glass light guide plate is advantageous for slimming the display devices because the glass light guide plate is excellent in rigidity to reduce the thickness thereof as compared to the plastic light guide plate, and is also advantageous due to the low thermal expansion and moisture-swelling properties thereof.

However, the glass light guide plate has problems in that the glass light guide plate has a low light transmittance as compared with the plastic light guide plate, and in particular, when a bare glass is fabricated for manufacturing a light guide plate, bubbles are generated inside the bare glass, and the performance of the light guide plate is deteriorated by the bubbles.

In addition, due to the difference in material between the plastic and the glass, various disadvantages have occurred when the method of forming a light guide pattern, which is formed on one side of a light guide plate, is equally applied to the plastic light guide plate and the glass light guide plate.

SUMMARY OF THE INVENTION

An object of the present invention is to provide a glass light guide plate of a back light unit for a a display device, which addresses the limitations and problems associated with the related art.

Another object of the present invention is to provide a glass light guide plate of a back light unit that provides light to a display panel of a display device in which the shape and position of a bubble inside a bare glass of the glass light guide plate are managed so that the performance of the glass light guide plate can be prevented from being deteriorated due to the bubble in the bare glass, and to provide a back light unit including the glass light guide plate.

Another object of the present invention is to provide a glass light guide plate having a light guide pattern that is suitable for the material of the glass light guide plate by optimizing the material of an ink of the light guide pattern, which is formed on one face of the light guide plate, an arrangement density of the light guide pattern, a curing process for the the light guide pattern, and so on, and to provide a back light unit including the glass light guide plate.

Still another object of the present invention is to provide a back light unit in which a spacing gap between a glass light guide plate and a light source is minimized so that a light leakage phenomenon, a hot spot phenomenon, or the like can be minimized.

In order to achieve the above-described and other objects, an embodiment of the present invention provides a back light unit for a display device. The back light unit includes: a light source unit disposed on at least one side of the display device; a glass light guide plate made of a glass material and disposed adjacent to one side the light source unit to guide light from the light source unit; and a reflector disposed below the glass light guide plate to reflect the light toward a display panel. A bubble having a major axis and a minor axis is included inside the glass light guide plate, and a direction of the major axis of the bubble forms a first angle with respect to a traveling direction of the light from the light source unit.

Another embodiment of the present invention provides a glass light guide plate for a back light unit of a display device. The glass light guide plate is disposed adjacent to one side of a light source unit included in the back light unit of the display device to guide light from the light source unit, a bubble having a major axis and a minor axis is included in the glass light guide plate, and a major axis direction of the bubble forms a first angle with respect to a traveling direction of the light from the light source unit.

According to embodiments of the present invention to be described below, by manufacturing a light guide plate using a glass material and managing the shape and position of bubbles existing inside a bare glass, it is possible to minimize a performance deterioration phenomenon, caused by the bubbles included in the glass material, of a light guide plate of a back light unit that provides light to a display panel of a display device.

Further, by optimizing a material of a light guide pattern ink for forming light guide patterns on one face of a glass light guide plate, an arrangement density of light guide patterns, a curing process of the light guide patterns, and so on to be suitable for the material of the glass light guide plate, it is possible to improve the bonding force of the light guide patterns to the glass light guide plate and the strength of the light guide patterns.

Consequently, by solving or minimizing the problem of a glass material, it is possible to provide a thin display device by reducing the thickness of the light guide plate, and to minimize light leakage and hot spot phenomena of the back light unit by reducing a spacing gap between the glass light guide plate and the light source.

BRIEF DESCRIPTION OF THE DRAWINGS

The above and other objects, features, and advantages of the present invention will be more apparent from the following detailed description taken in conjunction with the accompanying drawings, in which:

FIGS. 8A and 8B are views for illustrating a relationship between an optical gap, which is a distance between a glass light guide plate and a light source, and a brightness of a display panel according to an embodiment of the present invention.

DETAILED DESCRIPTION OF THE EMBODIMENTS

Figure 1:
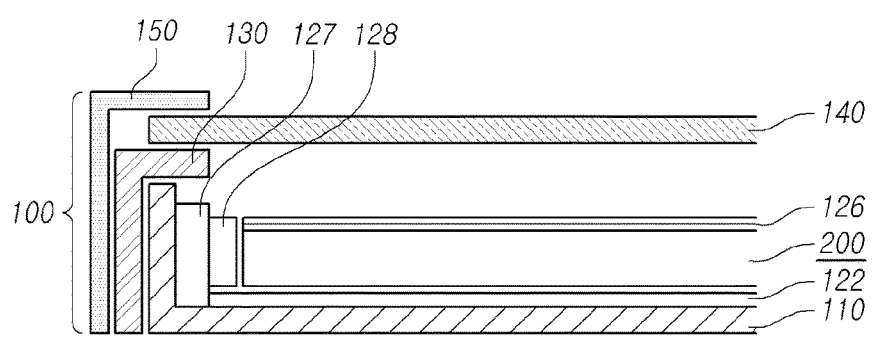
FIG. 1 is a sectional view of the side of the light inlet part of a display device that employs a glass light guide plate according to an embodiment of the present invention is used.

Hereinafter, some embodiments of the present invention will be described in detail with reference to the accompanying illustrative drawings. In designating elements of the drawings by reference numerals, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may be connected to", "be coupled to", or "be in contact with" the structural elements as well as that the certain structural element is directly connected to or is in direct contact with another structural element.

FIG. 1 is a light inlet side sectional view of a display device in which a glass light guide plate according to an embodiment of the present invention is used. All the components of the display device as well as a back light unit according to all embodiments of the present invention are operatively coupled and configured.

A display device, to which the present is applicable, may include a display panel 140, such as a liquid crystal display panel, and a back light unit disposed below the display panel 140 to irradiate light to the display panel, and may further include a cover bottom 110 configured to support the back light unit and extend over the entire rear face of the display device.

In addition, the display device may be additionally provided with a plastic-made guide panel 130 fixed to the cover bottom and configured to interconnect the back light unit and the display panel 140, a double-sided tape may be attached to a portion of the top face of the guide panel 130, and the display device 140 may be disposed on the double-sided tape to be fixedly mounted.

In addition, the display device may be further provided with a case top 150 configured to cover the cover bottom and the side face portion of the guide panel, which are disposed at the outermost position, and bent to extend to a portion of the front face of the display panel so as to protect the edge of the front face of the display panel.

The case top 150 encloses the side face portion of the display device and extends to a partial region of the front part of the display panel 140, thereby performing the function of protecting the display panel and a Chip-On-Film (COF) circuit unit that is a connection circuit configured to interconnect a system board unit and the display panel. The system board unit is a Printed Circuit Board (PCB) disposed behind the cover bottom so as to drive the display device.

In a case where the display panel 140 is a liquid crystal display panel, the display panel 140 may include: an array including plurality of gate lines, a plurality of data lines, a plurality of pixels defined at the cross regions of the gate lines and the data lines, and a thin film transistor configured to adjust light transmittance at each pixel; an upper substrate including a color filter and/or a black matrix or the like; and a liquid crystal material layer formed between the array board and the upper substrate.

In addition, the display device may include a back light unit configured to provide light to the display panel 140, and the back light unit may be classified into an edge type or a direct-type depending on an arrangement of a light source and a type of transferring light.

The back light unit, to which the present invention is applied, is an edge-type back light unit, and may include sub-units as follows: a light source unit including a light source 128, such as an LED, a holder to fix the light source, a light source drive circuit, and so on; a glass light guide plate 200 configured to diffuse light to the entire panel region; a reflector 122 configured to reflect the light toward the display panel; and at least one optical film or sheet 126 disposed on the light guide plate for the purpose of improving brightness, diffusion of light, protection, and so on.

The term, display device, is a concept of including a set electronic device or a set device, such as a notebook computer, a television, a computer monitor, and a mobile electronic device (such as a smart phone or an electronic pad), which include an Liquid Crystal Module (LCM) including a display panel and a drive unit configured to drive the display panel, as well as the display device, such as the LCM, in the narrow sense.

That is, in the present specification, the display device is used in the sense of including a set device which is an application product including an LCM, as well as a display device in the narrow sense, such as the LCM.

The light source unit used in the present embodiment may include a light source 128 that may be implemented using an LED chip, a light source package, or the like, and a light source PCB 127 on which the light source and a circuit element required for driving the light source are mounted.

The light source PCB 127 is a printed circuit board that extends along at least one side of the display device or the back light unit, and may be constituted with a printed circuit board base, an insulation layer, a power supply wiring layer, and so on.

The light source 128 may include so-called Chip-On-Board (COB) or Chip Scale Package (CSP)-type chips that are arranged on the light source PCB 127 at a predetermined interval, and mounted directly on the light source PCB using a Surface Mount Technology (SMT) without using a mold frame or a lead frame.

The light 128 used in the present embodiment may be an individual chip, such as an LED chip, but may be a light source package that is constituted with an LED chip, a mold structure, a lead frame, and so on.

The back light unit according to the present invention is an edge-type back light unit, and the above-mentioned light source unit may be disposed to extend along at least one of four sides of the display device.

In addition, the back light unit according to the present invention may further include a reflector 122 disposed on the bottom face of the glass light guide plate 200 and an optical sheet unit 126 disposed on the top face of the glass light guide plate 200.

The reflector 122 may be positioned on the rear face of the glass light guide plate 200 so as to perform a function of improving the brightness of light by reflecting the light that passes through the rear face of the light guide plate, toward the display panel 140.

The optical sheet unit 126 disposed on the glass light guide plate 200 is adapted to condense light so as to cause a more uniform plane light source to incident on the display panel 140, and may be constituted by combining one or more individual optical sheets.

The optical sheet unit 126 may be constituted by combining various functional sheets, such as a light condensing sheet or Prism Sheet (PS) configured to perform a light condensing function, a Diffusing Sheet (DS) configured to diffuse light, and a reflection type polarizing film called a Dual Brightness Enhancement Film (DBEF).

Meanwhile, a display panel, to which the back light unit according to the present invention is applicable, is not limited to the liquid crystal display panel, but may include other types of display devices that require a back light unit.

In addition, the metal or plastic-made cover bottom 110 covering the rear face and a portion of the side face of the display device, the guide panel 130 configured to support the display panel below the display panel, the case top 150 covering the outermost side face of the display device and the peripheral edge of the top face of the display panel, and so on may be additionally provided as structures for supporting the back light unit according to the present embodiment.

The cover bottom 110 used in the display device according to the present invention is an "L-shaped support structure that encloses the side face and the lower portion of the back light unit.

The cover bottom 110 is not limited to the term, and may be expressed by other terms, such as a back cover, a chassis, and frame.

Meanwhile, the cover bottom according to the present embodiment is not limited in terms of the material thereof, but may be fabricated using a material having a good heat conductivity, such as a metal, in consideration of the fact that the cover bottom should be in contact with a heat-conductive light source housing so as to radiate heat from the light source housing to the outside.

In addition, the guide panel 130 used in the display device according to the present embodiment is a plastic support structure that encloses the cover bottom 110 and supports the display panel 140 below the display panel 140.

The guide panel 130 extends to enclose the outside of the side face of the cover bottom 110 and a portion of the top side of the back light unit, and the display panel 140 is seated on the top of the horizontal support portion of the guide panel.

The guide panel 130 is generally formed of a plastic material, and may be expressed by using other terms, such as a mold frame, a middle cabinet, a plastic chassis, and a plastic frame.

The glass light guide plate 200 is a member configured to diffuse and guide the light incident from the light source unit to the entire back light unit, and is differentiated from the fact that the glass light guide plate 200 is made of a glass material. Hereinbelow, the detailed configuration of the glass light guide plate according to the present invention will be described in detail.

Among the components of the back light unit, the light guide plate is generally made of a light transmissive plastic material, such as polymethyl methacrylate (PMMA), methlystyrene (MS) resin, polystyrene (PS), polypropylene (PP), polyethylene terephthalate (PET), or polycarbonate (PC). Typically, a light guide plate made of PMMA is widely used.

As described above, such a plastic light guide plate has high light transmittance, but should have a thickness in a predetermined level or more in order to maintain a predetermined level of rigidity. The plastic light guide plate is characterized in that it has large thermal expansion coefficient and moisture-swelling.

Accordingly, a display device employing a plastic light guide plate of PMMA, PC, PS, or the like has a limitation in slimming, or has a limitation or requires an additional support structure in arranging a light guide plate and a light source unit.

In order to solve the disadvantages of the plastic light guide plate, the embodiment of the present invention uses a glass light guide plate 200 made of a glass material as the light guide plate used in the back light unit.

The glass light guide plate 200 is advantageous for slimming the display devices because the thickness of the glass light guide plate 200 can be reduced due to the excellent rigidity thereof as compared to the plastic light guide plate, and is also advantageous due to the low thermal expansion and moisture-swelling thereof.

Meanwhile, according to the present invention, the positional relationship of the glass light guide plate 200 with respect to the light source of the back light unit is determined according to the direction of bubbles existing inside the bare glass in order to prevent the performance thereof from being deteriorated by the bubbles generated when manufacturing the bare glass for the light guide plate.

In addition, the size of a light guide pattern formed on one side of the glass light guide plate 200 is determined according to the size of the bubbles inside the bare glass, and the arrangement density of the light guide pattern is adjusted according to a position within the light guide plate so as to provide an optimal performance.

In addition, when an ink used for the light guide pattern of the existing plastic light guide plate is equally applied to the glass light guide plate, the brightness of the light guide plate may be deteriorated, or the bonding force, strength, or the like of the light guide pattern may be deteriorated. Accordingly, the embodiment of the present invention proposes an ink configuration for a light guide pattern optimized for a glass light guide plate.

Hereinafter, detailed configurations of a glass light guide plate for this purpose and a back light unit including the glass light guide plate will be described in detail.

Figure 2A:
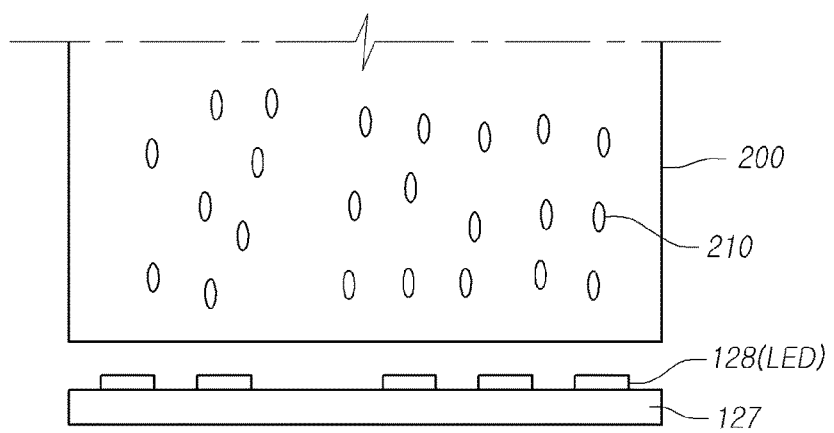
FIGS. 2A and 2B are plan views each illustrating a glass light guide plate and a light source unit, in which a relationship between the directions of bubbles included in the light guide plate and the positions of the light sources.
Figure 2B:
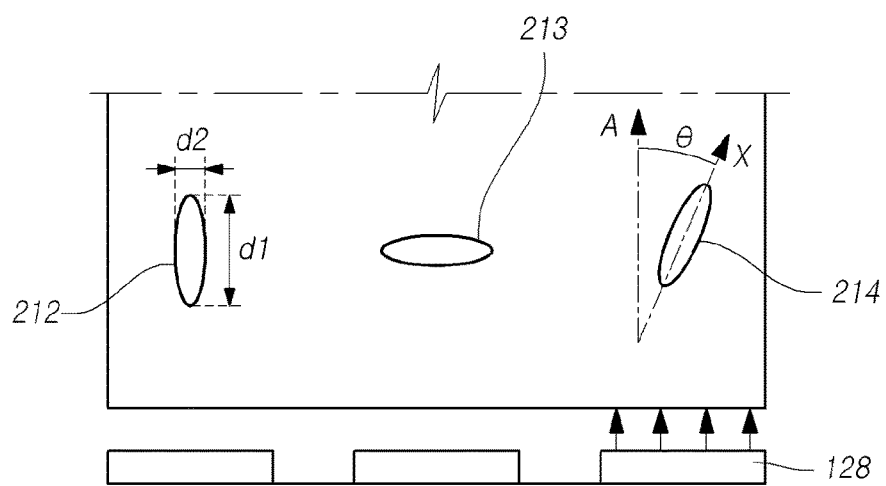

FIGS. 2A and 2B are plan views each illustrating a glass light guide plate and a light source unit, in which a relationship between the directions of bubbles included in the light guide plate and the positions of the light sources.

As shown in FIG. 1 and FIGS. 2A and 2B, the back light unit according to the embodiment of the present invention includes a light source unit disposed on at least one side of the display device; a glass light guide plate 200 made of a glass material and disposed at one side of the light source unit close to the light source unit so as to guide light from the light source unit; and a reflector 122 disposed below the glass light guide plate to reflect light to the display panel side.

As illustrated in FIGS. 2A and 2B, bubbles 210, each of which has a major axis and a minor axis, are included in the glass light guide plate 200, in which the major axis direction of the bubbles 210 may be equal to or smaller than a first angle with respect to the traveling direction of light from the light source unit.

The bare glass, which is a raw material of the glass light guide plate, is generally manufactured through a floating process.

The floating process manufactures a planar bare glass by cooling molten glass molten in a melting furnace while causing the molten glass to move by pouring the molten glass to a horizontal roller formed of molten tin (TiN).

Although a step of removing bubbles from the inside of a bare glass by lowering the temperature of the glass in a clean bath is performed in the process of the floating process, the bubbles are not completely removed, and as a result, a plurality of oval bubbles exceeding a predetermined size exist in the inside of the manufactured bare glass.

The oval bubbles 210 are arranged with certain directivity, and may be a barrier to diffuse the light from the light source 128 of the light source unit to the entire light guide plate. In the embodiment of the present invention, the major axis direction of the bubbles 210 is set to conform to the traveling direction of light as much as possible.

That is, in FIG. 2B, the bubbles 210, which are aligned with the traveling direction of light, have a minimum influence on the traveling of light. Whereas, the bubbles 213, of which the major axis direction is disposed at an angle close to 90 degrees with respect to the traveling direction of light, may block the traveling of light, thereby disturbing the diffusion of light to the inside of the light guide plate.

More specifically, as illustrated in FIG. 2B, when the angle formed between the major axis X of the bubbles 210 existing inside the glass light guide plate 200 and the traveling direction of light A is a first angle θ, the first angle is set to be in the range of 0 to 20 degrees.

That is, when the glass light guide plate 200 according to the present embodiment is manufactured by cutting the bare glass, the major axis direction of the bubbles 210 inside the glass light guide plate is made to conform to the traveling direction of light (i.e., the direction oriented from the light inlet part of the glass light guide plate to the light outlet part) as much as possible by cutting the bare glass in consideration of the major axis direction of the bubbles 210.

In addition, the length d1 of the major axis of the bubbles 210 may be 800 μm or less.

By manufacturing the glass light guide plate in such a manner in which the angle between the major axis direction of the bubbles 210 inside the glass light guide plate and the traveling direction of light is 20 degrees or less, the deterioration of light diffusion by the bubbles is minimized, and as a result, light is evenly diffused over the entire light guide plate.

Figure 3:
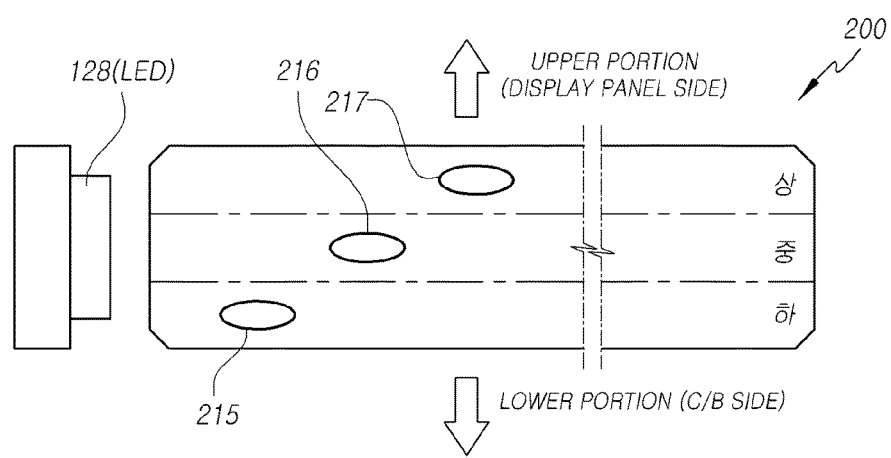
FIG. 3 illustrates a positional relationship of bubbles inside a glass light guide plate according to an embodiment of the present invention.

FIG. 3 illustrates a positional relationship of bubbles inside a glass light guide plate according to an embodiment of the present invention.

In the present specification, for the convenience of description, the direction of the display panel 140 side is defined as an upper portion, and the direction of the cover bottom side, which is opposite to the display panel 140 side, is defined as a lower portion.

Meanwhile, inside the glass light guide plate, more bubbles may be disposed in the upper portion of the light guide plate, or in the lower portion.

As in FIG. 3, the bubbles 217 disposed at the upper side of the glass light guide plate 200 have a large influence on the upward diffusion of light, as compared with the bubbles 216 disposed at the middle portion or the bubbles 215 disposed at the lower side.

That is, as more bubbles are disposed in the upper portion of the glass light guide plate, in order to secure desired image quality, an optical sheet disposed on the light guide plate should have a higher hiding power, and the display panel should have a lower transmissivity.

Accordingly, as more bubbles are disposed in the upper portion of the glass light guide plate, there are problems in that requirements for the optical sheet become more complicated, and the transmissivity of the display panel should be lowered.

Thus, in the embodiment of the present invention, it is desirable that the bubbles disposed inside the glass light guide plate are made to at least be positioned in the portion that is not higher than the middle portion of the glass light guide plate.

Typically, because the vertical positions of the bubbles inside the bare glass may be adjusted or managed by changing the above-mentioned process of manufacturing a bare glass, the bubbles disposed inside the glass light guide plate can be made to at least be disposed in the portion that is not higher than the middle portion of the glass light guide plate by optimizing the process of manufacturing a bare glass.

When the vertical positions of the bubbles inside the glass light guide plate are made to not be higher than the middle portion, it is possible to minimize the influence that may be inevitably caused by the bubbles.

As described above, when a glass light guide plate is used, a bubble problem, which has not occurred in the existing plastic light guide plate, may occur. The embodiment of the present invention is to minimize the deterioration in light guide performance by bubbles inevitably generated inside the bare glass by optimizing the arrangement of the direction of the bubbles and a light source and/or the vertical positions of the bubbles.

Meanwhile, a predetermined type of a pattern is used on one face of the glass light guide plate 200 according to the embodiment of the present invention for the purpose of upward diffusion of light. The pattern may be referred to as a light guide pattern 220.

The light guide pattern 220 is to improve a light condensing property for light projected to the display panel side or to cause the light to be uniformly propagated over the entire display panel, may include a dot pattern of circular shapes or the like or a cross-section pattern formed to extend in one direction while having a specific cross-sectional shape.

An ink used for forming such a light guide pattern may be defined as a light guide pattern ink composition. The light guide pattern ink composition may include an acryl copolymer with an acrylate group, which is capable of forming a printed coating film and adjusting adhesion with respect to the light guide plate, a polymethyl methacrylate (PMMA) bead, which is capable of scattering (diffusing) light, and a solvent for adjusting the viscosity of the ink and a workability of a silk screen, the solvent being included according to a predetermined weight %.

A light guide pattern is formed over the whole of one face of the light guide plate according to a predetermined distribution method by using the light guide pattern ink, and at this time, a printing type or imprinting process may be used.

Figure 4A:
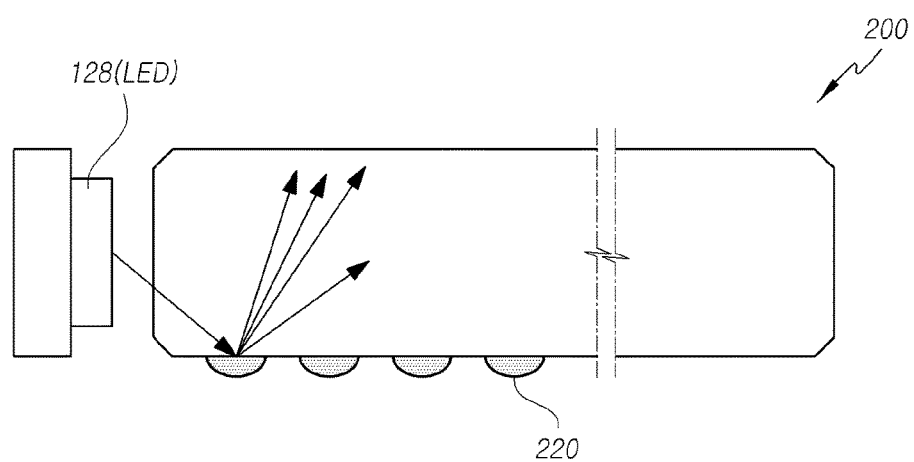
FIGS. 4A and 4B are views each illustrating a relationship between light guide patterns formed on one face of a glass light guide plate according to an embodiment of the present invention and the size of bubbles existing inside the light guide plate.
Figure 4B:
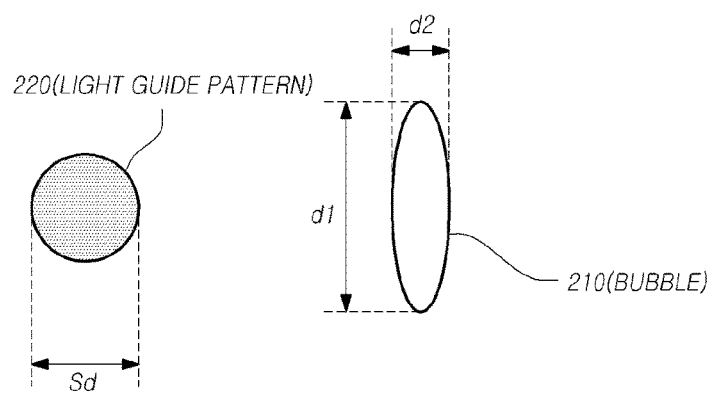

FIGS. 4A and 4B are views illustrating a relationship between a light guide pattern formed on one face of a glass light guide plate according to an embodiment of the present invention and the size of bubbles existing inside the light guide plate.

As in FIGS. 4A and 4B, the glass light guide plate according to the present embodiment includes bubbles existing therein unlike a plastic light guide plate, and the size of the light guide pattern 220 may be determined in connection with the size of the bubbles 210.

More specifically, the size Sd of the light guide pattern 220 of the glass light guide plate according to the present embodiment may be determined to be equal to or larger than the length d2 of the minor axis of the bubbles 210, and to be equal to or smaller than the length d1 of the major axis of the bubbles 210.

The light guide pattern 220 in the present embodiment may be a dot pattern of a circular shape, but may have other shapes, such as an oval shape or a polygonal shape without being limited thereto. At this time, the size Sd of the light guide pattern means a diameter in the case where the light guide pattern is a dot pattern, and a length of one side in the case where the light guide pattern is a square pattern.

In the case where the size Sd of the light guide pattern 220 is smaller than the length d2 of the minor axis of the bubbles, the size of the light guide pattern becomes too small to be formed, and it is impossible to secure the light diffusion performance of the light guide plate because the light diffusion performance by the dot pattern becomes lower than the light blocking characteristic of the bubbles.

In addition, in the case where the size Sd of the light guide pattern 220 is larger than the length d2 of the minor axis of the bubbles, the light guide pattern is visually recognized which may cause the deterioration of image quality.

Accordingly, in the embodiment of the present invention, it is possible to minimize the deterioration of the light diffusion performance of the light guide plate that is caused by bubbles while causing the light guide pattern not to be visually recognizable by setting the size Sd of the light guide pattern 220 formed on one face of the glass light guide plate to be larger than the length of the minor axis of the bubbles and to be smaller than the length of the major axis of the bubbles.

Figure 5A:
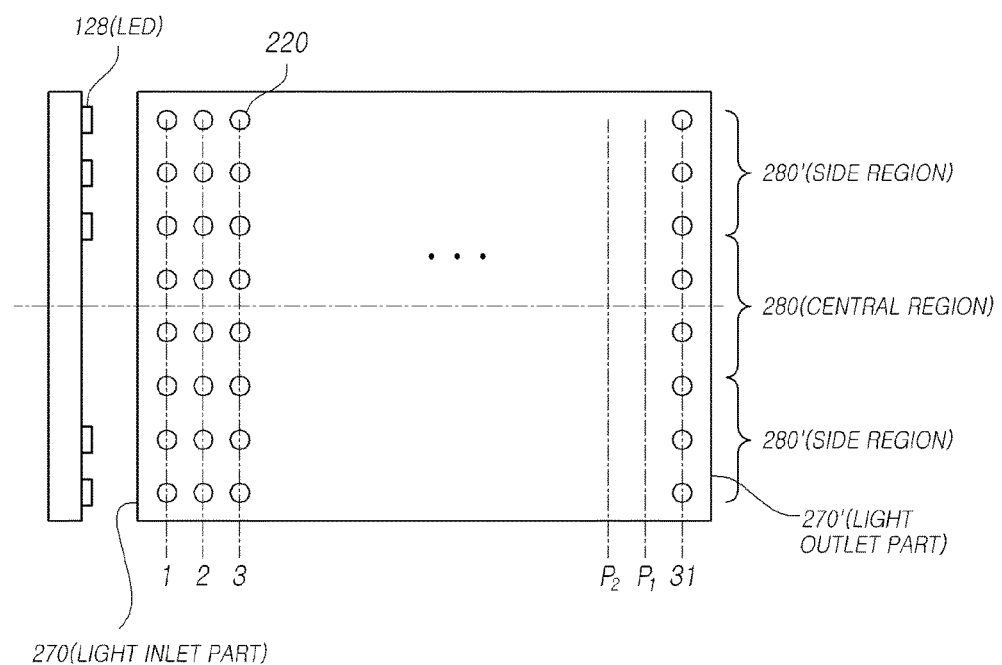
FIG. 5A is a view illustrating a structure of arranging dot patterns that are formed on one face of a glass light guide plate according to an embodiment of the present invention.

FIG. 5A is a view illustrating a structure of arranging dot patterns that are formed on one face of a glass light guide plate according to an embodiment of the present invention.

According to the embodiment of the present invention, a plurality of light guide patterns 220 are formed on one face of the glass light guide plate. At this time, the light guide patterns may have the same size and shape, but the sizes and shapes of the light guide patterns may be determined in a random manner without being limited thereto.

FIG. 5A illustrates an example in which light guide patterns 220 having the same shape and size are formed on one face of a glass light guide plate in which an arrangement density of light guide patterns may vary depending on a position on the light guide plate.

That is, when the number of light guide patterns formed per unit area of the glass light guide plate is defined as the arrangement density of light guide patterns, the arrangement density of the light guide patterns may be differently determined according to the position on the light guide plate.

The light source unit according to the embodiment of the present invention may be disposed to extend along at least one of four sides of the display device. Hereinafter, it is assumed that the light source unit is only disposed on the one right side of the display device for the convenience of description.

In addition, hereinafter, for the convenience of description, in the one side of the glass light guide plate 200, the side face adjacent to the light source 128 will be referred to as a light inlet part 270, and the side face, which is opposite to the light inlet part 270, will be referred to as a light outlet part 270'.

In addition, in total, 31 rows of light guide patterns 220 are formed in parallel with the light source unit from the light inlet part to the light outlet part. The rows will be referred to as a $1^{st}$ row, a $2^{nd}$ row, . . . , and a $31^{th}$ row of the light guide pattern in this order from the row nearest to the light inlet part.

According to the present embodiment, the arrangement density of the light guide patterns 220 formed on one face of the glass light guide plate 200 may be increased from the light inlet part 270 to a first point P1 adjacent to the light outlet part 270' at a first increment rate, and may be decreased from the first point P1 to the light outlet part 270' at a second decrement rate.

That is, assuming that all the light guide patterns 220 have the same size and shape, it means that the number of light guide patterns in the $1^{st}$ row is the smallest, and the number of light guide patterns in each row is increased in the order of the $2^{nd}$ row, the $3^{rd}$ row, and so on.

Figure 5B:
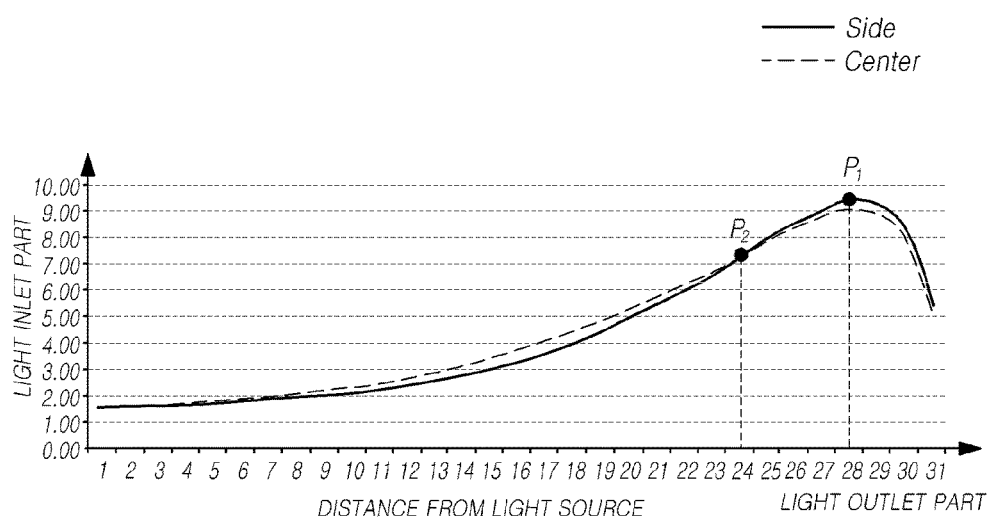
FIG. 5B illustrates an arrangement density of light guide patterns in a graph in which the horizontal axis represents the numbers of rows of light guide patterns from the light inlet part to the light outlet part, and the vertical axis represents the arrangement density of light guide patterns included in each corresponding row of light guide patterns.

FIG. 5B illustrates the arrangement density of light guide patterns in a graph in which the horizontal axis represents the numbers of rows of light guide patterns from the light inlet part to the light outlet part, and the vertical axis represents the arrangement density of light guide patterns included in each corresponding row of light guide patterns.

As in FIG. 5B, the arrangement density of light guide patterns increases at the first increment rate from the light inlet part toward the light outlet part, and the increment in the arrangement density of light guide patterns is continued to the first point (e.g., the $28^{th}$ row of light guide patterns) adjacent to the light outlet part.

On the contrary, from the first point P1 to the light outlet part (the $31^{th}$ row), the arrangement density of light guide patterns decreases at a second decrement rate.

At this time, the absolute value of the first increment rate from the light inlet part to the first point P1 may be smaller than the absolute value of the second decrement rate from the first point P1 to the light outlet part.

That is, the arrangement density of light guide patterns may gradually increase at the first increment rate from the light inlet part to the first point P1 and may then rapidly decrease at the second decrement rate from the first point P1 to the light outlet part.

In general, the intensity of light is strong at the light inlet part side, and the intensity of light to be transferred becomes weaker toward the light outlet part side. Accordingly, because the ratio of light diffused to be directed to the upper portion of the light guide plate should increase toward the light outlet part side, the arrangement density of light guide patterns that perform the function of diffusing light is made to gradually increase.

Meanwhile, a side reflector is provided at the light outlet part 270' side so that the light transferred to the light outlet part is retro-reflected to the light inlet part 270 side, and due to the light retro-reflected by the side reflector of the light outlet part, the intensity of light is strengthened in the vicinity of the light outlet part.

Accordingly, in order to compensate for the increment of the light intensity at the light outlet part, the arrangement density of light guide patterns is made to decrease from the predetermined first position P1 adjacent to the light outlet part.

By causing the arrangement density of light guide patterns to gradually increase at the first increment rate from the light inlet part to the first point P1, and to then rapidly decrease at the second decrement rate from the first point P1 to the light outlet part, the distribution of light, which is diffused to the upper portion of the glass light guide plate by the light guide patterns, may be brought into uniformity.

Meanwhile, because the light source unit includes a plurality of light sources that are arranged in a row, the light intensity of the longitudinal central portion of the light source unit is stronger than that of the edge portions of the light source unit.

In addition, the rectilinear propagation property of light is further strengthened in the glass light guide plate 200 as in the present embodiment, unlike in the plastic light guide plate.

Accordingly, as illustrated in FIG. 5A, when the region of the glass light guide plate 200 is divided, along the longitudinal direction of the light source unit, into a central region 280 that corresponds to the central region of the light source unit, and side regions 280' correspond to the opposite edges of the light source unit, from the light inlet part to a second point P2 adjacent to the light outlet part, the arrangement density of light guide patterns in the central region 280 may be equal to or higher than the arrangement density of light guide patterns in the side regions 280'.

As described above, the rectilinear propagation property of light is strengthened in the glass light guide plate 200 as in the present embodiment as compared with the plastic light guide plate. Thus, the intensity of light directed to the upper portion can be brought into uniformity over the entire light guide plate only when the diffusion of light increases in the central region 280 of the glass light guide plate where the stronger light is introduced.

As described above, from the light inlet part to the second point P2 adjacent to the light outlet part, by making the arrangement density of light guide patterns of the central region 280 of the glass light guide plate 200 higher than that in the side regions 280', it is possible to maintain the light diffusion by the light guide patterns to be uniform over the entire light guide plate.

Meanwhile, as a result of testing, it has been found that the first point P1, which is the inflection point of the arrangement density of light guide patterns between the light inlet part and the light outlet part, is located in the vicinity of the $28^{th}$ row among the 31 rows in total, and the second point P2, which is the uppermost limit in increasing the arrangement density of light guide patterns in the central region, is located in the vicinity of the $24^{th}$ row.

That is, the first point P1, which is the inflection point of the arrangement density of light guide patterns between the light inlet part and the light outlet part, may be located closer to the light outlet part than the second point P2, which is the uppermost limit in increasing the arrangement density of light guide patterns in the central region.

Figure 6:
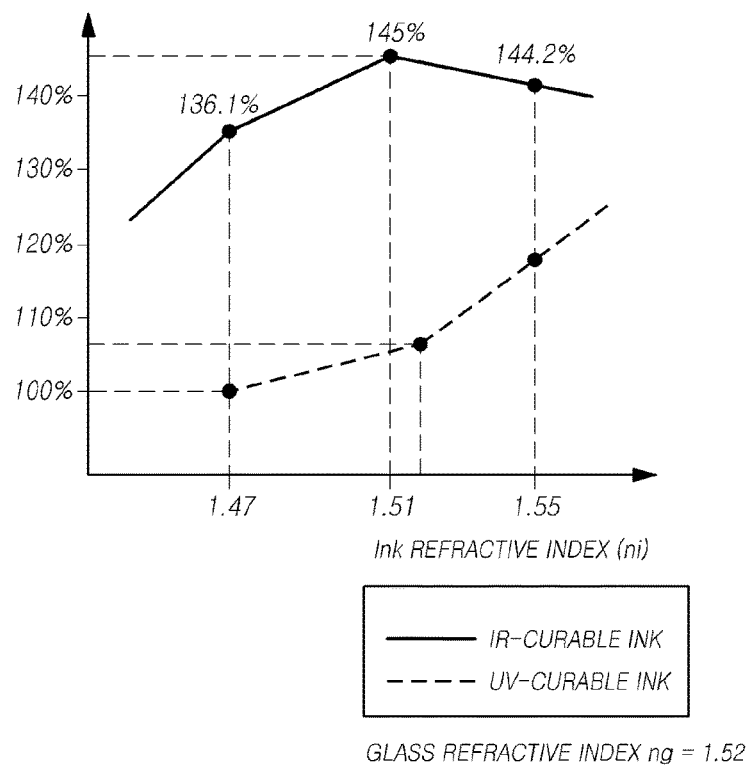
FIG. 6 is a view illustrating a difference in brightness according to an ink material for light guide patterns according to an embodiment of the present invention.

FIG. 6 is a view illustrating a difference in brightness according to an ink material for light guide patterns according to an embodiment of the present invention.

As described above, the light guide patterns 220 according to the present embodiment may be formed in a manner of imprinting or printing predetermined patterns on one face of a light guide plate 200 by using a predetermined light guide pattern ink, and then curing the patterns to be fixed to the light guide plate.

At this time, the light guide pattern ink may generally be a UV-curable ink that is cured by ultraviolet (UV) rays or an IR-curable ink that is cured by infrared (IR) rays, and in a conventional PMMA light guide plate, PS light guide plate, or the like, both the light guide pattern inks have been used.

However, in the case of the glass light guide plate 200 as in the present embodiment, because $SiO_2$, which is a glass material, is prone to the UV rays, the IR-curable ink may be used for fabricating the light guide patterns 220 of the glass light guide plate 200 according to the present embodiment.

At this time, for the glass refractive index ng of the glass light guide plate, the refractive index ni of the IR-curable light guide pattern ink may satisfy Equation 1 as follows:

$$ng-0.02<ni<ng+0.04 \qquad \text{Equation 1}$$

More specifically, the IR-curable ink used for forming the light guide patterns of the glass light guide plate 200 according to the embodiment of the present invention may be composed of a composition that includes a resin that is an IR-curable polymer, light diffusing particles, and so on, and the refractive index of the IR-curable ink may be equal to the refractive index of the glass light guide plate, or may be included within the range of −0.02 to +0.04 with respect to the refractive index of the glass light guide plate.

FIG. 6 illustrates the test results in graphs in which a dotted line represents brightness in a case in which light guide patterns were formed on a glass light guide plate using a UV-curable ink, and a solid line represents brightness in a case in which light guide patterns were formed using an IR-curable ink as in the present embodiment.

For the convenience of comparison, it is assumed that the glass refractive index ng of the glass light guide plate is 1.52, and the brightness of a back light unit having light guide patterns formed using a UV-curable ink, of which the refractive index is 1.47, is 100%.

As in FIG. 6, when light guide patterns are formed on the glass light guide plate using the UV-curable ink, which has been used for an existing plastic light guide plate, it has been found that there is an increment of brightness merely up to about 20% even though the brightness is changed depending on the refractive index of the ink.

On the contrary, in the case where light guide patterns are formed on the glass light guide plate using the IR-curable ink as in the present embodiment, it has been found that the brightness of the back light unit increases about 36% or more depending on the refractive index of the IR-curable ink.

In particular, the maximum increment of about 45% in brightness is shown in the case where the refractive index ni of the IR-curable ink is 1.51 to be lower by 0.01 than the glass refractive index ng, 1.52, and it has been found that, when the refractive index ni of the IR-curable ink exceeds 1.55 (ni>1.55) to be larger by 0.03 or more than the glass refractive index ng, 1.52, the increment rate in brightness is lowered.

Accordingly, as in the embodiment of the present invention, when an IR-curable ink having a predetermined relationship with the refractive index of a glass light guide plate is used in order to form the light guide patterns on the glass light guide plate, the increment in brightness of the glass light guide plate can be maximized.

In addition, when the light guide patterns were formed on an existing acrylic-based plastic light guide plate using the IR-curable ink, in the curing step, the IR-curable ink was cured at a temperature of about 70 to 80° C. for about 90 seconds after printing the light guide patterns.

However, in the case where the above-mentioned curing condition is applied to the glass light guide plate as in the present embodiment, it has been found that requested bonding force and strength are not secured in the formed light guide patterns.

Accordingly, in the embodiment of the present embodiment, after printing light guide patterns using an IR-curable ink having the above-mentioned configuration (ng−0.02<ni<ng+0.04), and the light guide patterns were cured for 5 minutes or more at a temperature of about 130° C. or more.

According to a migration test performed under specific conditions (pressing with 0.1 to 0.8 kg for 24 hours under the environment of a humidity of 60% at 60° C.) for the light guide patterns fabricated under the curing conditions of 5 minutes or more at about 130° C. or more as described above, and the light guide patterns formed under the existing curing conditions (at a temperature of about 70 to 80° C. and for about 90 seconds), it has been found that the light guide patterns formed according to the present invention are superior to the existing light guide patterns in terms of bonding force and strength.

As described above, when the light guide patterns are formed under a curing condition of 5 minutes or more at about 130° C. or more by changing the existing IR-curable ink curing condition, the strength of the light guide patterns and the bonding force of the light guide patterns to a glass light guide plate can be enhanced.

Figure 7:
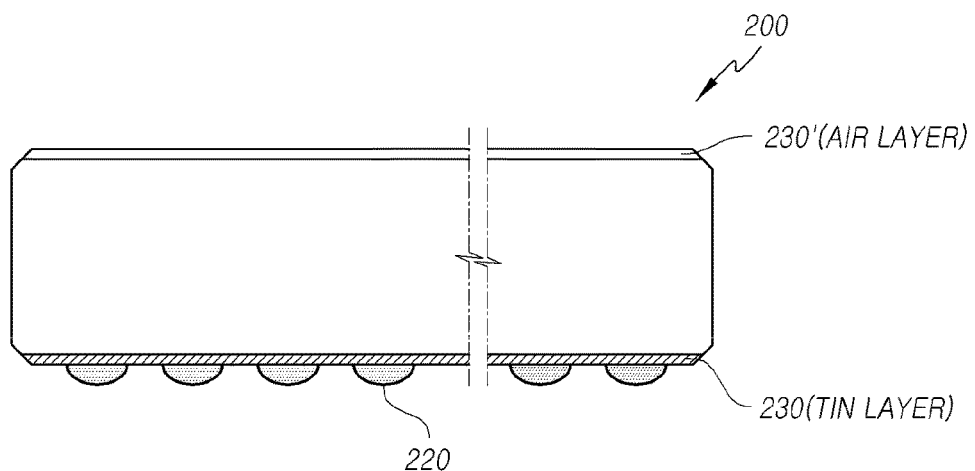
FIG. 7 is a view illustrating an embodiment in which light guide patterns are only formed on a tin layer of the opposite faces of a glass light guide plate.

FIG. 7 is a view illustrating an embodiment in which a light guide pattern is only formed on a tin layer of the opposite faces of a glass light guide plate.

As described above, because, in a floating process of manufacturing a bare glass, molten glass is cooled while the molten glass is passing through a horizontal roller formed of molten tin (TiN), a tin layer partially containing the tin component is formed on one face of the bare glass in this process.

Accordingly, one of the opposite faces of the glass light guide plate according to the present embodiment may be formed with a tin layer 230 in which some tin component is included, and the other face does not contain the tin component at all.

In the present specification, of the opposite faces of the glass light guide plate, the face including the tin (TiN) component will be referred to as a tin layer 230, and the other face will be referred to as an air layer 230'.

Meanwhile, the light guide patterns may be formed on one of the opposite faces of the glass light quid plate. Assuming that the brightness of the back light unit in the case where the light guide patterns 220 are formed on the face formed with the tin layer 230 is 100%, it has been found that the brightness of the back light unit in the case where the light guide patterns 220 are formed on the face formed with the air layer 230' is reduced to about 83% to 86%.

The tin component included in the tin layer 230 of the glass light guide plate 200 also performs the function of diffusing light to some extent. Thus, by forming the light guide patterns on the face formed with the tin layer, rather than on the face formed with the air layer, the light diffusing property of the light guide patterns is further improved.

Thus, according to the present embodiment, the tin layer (TiN) 230 is disposed on one face of the glass light guide plate 200, the air layer 230' is disposed on the other face, and the light guide patterns 220 are disposed on the face formed with the tin layer.

As described above, of the opposite faces of the glass light guide plate, by forming the light guide patterns 220 on the face where the tin layer 230 is formed, it is possible to improve the light diffusing performance of the light guide patterns such that the brightness of the back light unit can be enhanced.

Figure 8A:
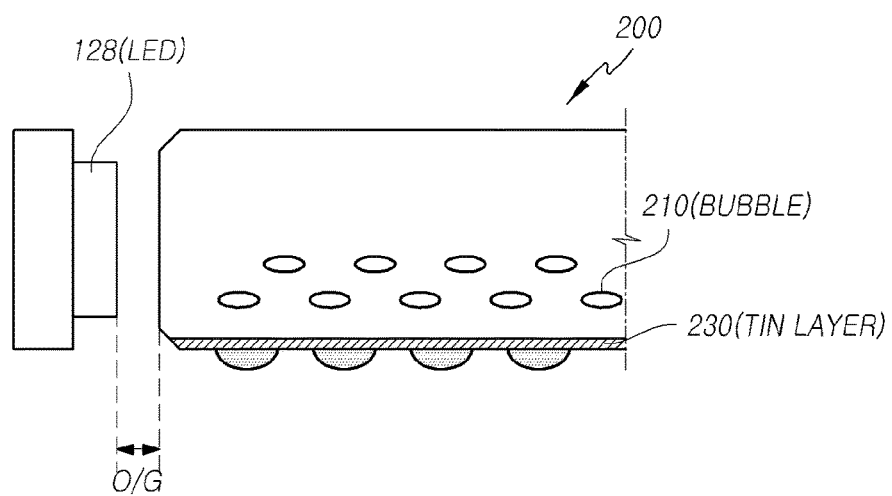

FIGS. 8A and 8B are views for illustrating a relationship between an optical gap, which is a distance between a glass light guide plate and a light source, and a brightness of a display panel according to an embodiment of the present invention.

As in FIG. 8A, a light source unit and a glass light guide plate 200 are arranged in such a manner in which a predetermined optical gap O/G is formed between the LED light source 128 of the light source unit and the face of the light inlet part of the glass light guide plate 200.

The optical gap between the light source and the light guide plate is provided as a measure of the expansion of the light guide plate, which may be caused due to heat or moisture. The existing plastic (PMMA) light guide plate requires the optical gap of about 0.4 mm or more due to the relatively high thermal expansion and moisture-swelling properties.

However, when the optical gap between the light source and the light guide plate increases, the light from the light source partially leaks without being incident on the light guide plate such that the efficiency is reduced, and a light leakage phenomenon is generated around the light inlet part.

On the contrary, because the glass light guide plate 200 according to the present embodiment has relatively low thermal expansion and moisture-swelling properties, it is possible to reduce the optical gap O/G between the light source and the light guide plate.

More specifically, as in FIG. 8B, a bright-line level, which represents the entire brightness of a display panel (the brightness of one (1) panel and the average brightness of nine (9) panels) and image quality (FOS) at the light inlet part, was monitored when the optical gap O/G between the light source and the light guide plate is set to 0.1 mm, 0.2 mm, and 0.3 mm.

As a result, when the optical gap O/G, which is the spacing distance between the glass light guide plate 200 and the light source 128 according to the present embodiment, is 0.15 mm or less, it has been found that the brightness in a panel is hardly reduced without causing a problem according to the swelling of the glass light guide plate, and the bright-line level also accords with the requirements of mass production.

In this way, by setting the optical gap O/G between the glass light guide plate 200 and the light source 128 according to the present embodiment to 0.15 mm or less, it is possible to maintain the optical efficiency of the light guide plate while minimizing the reduction of the brightness of a panel, and to prevent the light leakage phenomenon in the light inlet part or the like.

When the embodiments of the present invention as described above are used, by manufacturing a light guide plate of a back light unit that provides light to a display panel of a display device using a glass material, and optimizing the relationship between the direction of the bubbles existing inside the glass light guide plate and the light source, the sizes of bubbles and light guide patterns, and so on, it is possible to minimize a performance deterioration phenomenon of a light guide plate, which is caused by the bubbles inevitably included in a bare glass.

In addition, by optimizing the arrangement density of light guide patterns in each region, which are formed on one face of a glass light guide plate, it is possible to cause light to be uniformly diffused over the entire glass light guide plate.

Further, by selecting an IR-curable ink having a predetermined refractive index for a light guide pattern ink for forming light guide patterns on one face of a glass light guide plate, and optimizing a curing process of the light guide patterns and so on to be suitable for the material of the glass light guide plate, it is possible to improve the bonding force of the light guide patterns to the glass light guide plate and the strength of the light guide patterns.

Consequently, by using a glass light guide plate instead of the existing plastic light guide plate by solving a problem of a glass material, it is possible to slim a display device by reducing the thickness of the light guide plate, and to minimize light leakage and hot spot phenomena of the back light unit by reducing a spacing gap between the glass light guide plate and the light source.

The above description and the accompanying drawings provide an example of the technical idea of the present invention for illustrative purposes only. Those having ordinary knowledge in the technical field, to which the present invention pertains, will appreciate that various modifications and changes in form, such as combination, separation, substitution, and change of a configuration, are possible without departing from the essential features of the present invention. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A back light unit for a display device including a display panel, the back light unit comprising:
   a light source unit disposed on at least one side of the display device;
   a glass light guide plate disposed adjacent to one side of the light source unit to guide light from the light source unit;
   a reflector disposed below the glass light guide plate to reflect the light toward the display panel;
   a plurality of ovoid bubbles fully enclosed within the glass light guide plate, each of the plurality of ovoid bubbles including a minor axis and a major axis that is longer than the minor axis; and
   a plurality of light guide patterns disposed on a lower surface of the glass light guide plate,
   wherein a direction of the major axis of each of the plurality of ovoid bubbles forms a first angle that is an acute angle with respect to a traveling direction of the light from the light source unit, and
   wherein each of the plurality of light guide patterns has a length that is greater than or equal to a length of the minor axis of each of the plurality of ovoid bubbles, and the length of each of the plurality of light guide patterns is less than or equal to the length of the major axis of each of the plurality of ovoid bubbles.

2. The back light unit of claim 1, wherein the first angle is approximately 20 degrees or less, and the major axis of each of the plurality of ovoid bubbles has a length that is approximately 800 μm or less.

3. The back light unit of claim 1, wherein the glass light guide plate includes:

a light inlet part that is a side face adjacent to the light source unit, and a light outlet part that is a side face opposite to the light inlet part, wherein an arrangement density of the plurality of light guide patterns increases from the light inlet part to a first point adjacent to the light outlet part at a first increment rate, and then decreases from the first point to the light outlet part at a second decrement rate.

4. The back light unit of claim 3, wherein the glass light guide plate further includes:

a central region corresponding to a central portion of the light source unit, and side regions corresponding to opposite side edges of the light source unit, wherein an arrangement density of the plurality of light guide patterns in the central region from the light inlet part to a second point adjacent to the light outlet part is greater than or equal to an arrangement density of the plurality of light guide patterns in the side regions.

5. The back light unit of claim 1, wherein the plurality of light guide patterns are fabricated using an infrared (IR)-curable ink, and wherein, for a glass refractive index (ng) of the glass light guide plate, a refractive index ni of the IR-curable ink satisfies a condition as follows:

$ng-0.02<ni<ng+0.04$.

6. The back light unit of claim 1, wherein a tin layer (TiN) is disposed on the lower surface of the glass light guide plate, an air layer is disposed on an upper surface of the glass light guide plate, and the plurality of light guide patterns is disposed on the tin layer, and wherein the tin layer is between the glass light guide plate and the plurality of light guide patterns.

7. The back light unit of claim 1, wherein an optical gap, which is a spacing distance between the light source unit and the glass light guide plate, is approximately 0.15 mm or less.

8. The back light unit of claim 1, wherein the glass light guide plate includes a middle portion halfway between the lower surface of the glass light guide plate and an upper surface of the glass light guide plate, and wherein the plurality of ovoid bubbles are disposed in an area between the middle portion and the lower surface of the glass light guide plate, and the plurality of ovoid bubbles are absent from an area between the middle portion and the upper surface of the glass light guide plate.

9. A glass light guide plate for a back light unit of a display device, the glass light guide plate comprising:

a plurality of ovoid bubbles fully enclosed within the glass light guide plate, each of the plurality of ovoid bubbles including a minor axis and a major axis that is longer than the minor axis; and a plurality of light guide patterns disposed on a lower surface of the glass light guide plate, wherein a direction of the major axis of each of the plurality of ovoid bubbles forms a first angle that is an acute angle with respect to a traveling direction of light from a light source unit, and wherein each of the plurality of light guide patterns has a length that is greater than or equal to a length of the minor axis of each of the plurality of ovoid bubbles, and the length of each of the plurality of light guide patterns is less than or equal to the length of the major axis of each of the plurality of ovoid bubbles.

10. The glass light guide plate of claim 9, wherein the first angle is approximately 20 degrees or less, and the major axis of each of the plurality of ovoid bubbles has a length that is approximately 800 μm or less.

11. The glass light guide plate of claim 9, wherein the glass light guide plate further includes:

a light inlet part that is a side face for facing adjacent to a light source unit, and a light outlet part that is a side face opposite to the light inlet part, wherein an arrangement density of the plurality of light guide patterns increases from the light inlet part to a first point adjacent to the light outlet part at a first increment rate, and then decreases from the first point to the light outlet part at a second decrement rate.

12. The glass light guide plate of claim 11, wherein the glass light guide plate further includes:

a central region corresponding to a central portion of the light source unit, and side regions corresponding to opposite side edges of the light source unit, wherein an arrangement density of the plurality of light guide patterns in the central region from the light inlet part to a second point adjacent to the light outlet part is greater than or equal to an arrangement density of the light guide patterns in the side regions.

13. The glass light guide plate of claim 9, wherein the plurality of light guide patterns are fabricated using an infrared (IR)-curable ink, and wherein, for a refractive index (ng) of glass of the glass light guide plate, a refractive index ni of the IR-curable ink satisfies a condition as follows:

$ng-0.02<ni<ng+0.04$.

14. The glass light guide plate of claim 9, wherein a tin layer (TiN) is disposed on the lower surface of the glass light guide plate, an air layer is disposed on an upper surface of the glass light guide plate, and the plurality of light guide patterns is disposed on the tin layer, and wherein the tin layer is between the glass light guide plate and the plurality of light guide patterns.

15. The glass light guide plate of claim 9, wherein the glass light guide plate includes a middle portion halfway between the lower surface of the glass light guide plate and an upper surface of the glass light guide plate, and wherein the plurality of ovoid bubbles are disposed in an area between the middle portion and the lower surface of the glass light guide plate, and the plurality of ovoid bubbles are absent from an area between the middle portion and the upper surface of the glass light guide plate.

* * * * *